United States Patent [19]

Keener et al.

[11] Patent Number: 5,287,476
[45] Date of Patent: Feb. 15, 1994

[54] PERSONAL COMPUTER SYSTEM WITH STORAGE CONTROLLER CONTROLLING DATA TRANSFER

[75] Inventors: Don S. Keener; Gregory J. Moore, both of Boca Raton, Fla.

[73] Assignee: International Business Machines Corp., Armonk, N.Y.

[21] Appl. No.: 712,237

[22] Filed: Jun. 7, 1991

[51] Int. Cl.$^5$ .............................................. G06F 9/00
[52] U.S. Cl. .............................. 395/425; 364/DIG. 1; 364/265.3; 371/24; 371/71
[58] Field of Search ...................... 371/24, 71; 395/425

[56] References Cited

U.S. PATENT DOCUMENTS

| | | |
|---|---|---|
| 4,541,066 | 9/1985 | Lewandowski ................... 371/24 |
| 4,630,041 | 12/1986 | Casamatta et al. ............... 371/71 |
| 4,724,380 | 2/1988 | Burrows et al. .................. 371/24 |

Primary Examiner—David L. Robertson
Attorney, Agent, or Firm—Daniel E. McConnell

[57] ABSTRACT

This invention relates to personal computers, and more particularly to a personal computer using a small computer systems interface (SCSI) controller coupled directly to the local processor bus for controlling data transfer with storage memory devices such as fixed or removable media electromagnetic storage devices. The personal computer has a high speed local processor data bus and a storage controller coupled directly to said local processor bus for regulating communications between a processor and storage memory devices. The storage controller has at least one counter for tracking at least one of address and count data for blocks of data being transferred and capable of signalling through the local processor bus the state of the counter, and a bi-stable device interposed between the counter and the local processor bus for enabling delivery to the local processor bus of data representing an initial state of the counter at the beginning of a transfer of blocks of data and for continuing delivery of initial state data throughout a transfer of blocks of data. The counter and bi-stable device cooperate for permitting one of incrementing and decrementing of the counter during transfer of blocks of data while avoiding changes in counter state data delivered to the local processor bus during transfer of blocks of data.

5 Claims, 4 Drawing Sheets

PERSONAL COMPUTER SYSTEM WITH STORAGE CONTROLLER CONTROLLING DATA TRANSFER

TECHNICAL FIELD

This invention relates to personal computers, and more particularly to a personal computer using a small computer systems interface (SCSI) controller coupled directly to the local processor bus for controlling data transfer with storage memory devices such as fixed or removable media electromagnetic storage devices.

BACKGROUND OF THE INVENTION

Personal computer systems in general and IBM personal computers in particular have attained widespread use for providing computer power to many segments of today's modern society. Personal computer systems can usually be defined as a desk top, floor standing, or portable microcomputer that consists of a system unit having a single system processor and associated volatile and non-volatile memory, a display monitor, a keyboard, one or more diskette drives, a fixed disk storage, and an optional printer. One of the distinguishing characteristics of these systems is the use of a motherboard or system planar to electrically connect these components together. These systems are designed primarily to give independent computing power to a single user and are inexpensively priced for purchase by individuals or small businesses. Examples of such personal computer systems are IBM's PERSONAL COMPUTER AT and IBM's PERSONAL SYSTEM/2 Models 25, 30, L40SX, 50, 55, 65, 70, 80, 90 and 95.

These systems can be classified into two general families. The first family, usually referred to as Family I Models, use a bus architecture exemplified by the IBM PERSONAL COMPUTER AT and other "IBM compatible" machines. The second family, referred to as Family II Models, use IBM's MICRO CHANNEL bus architecture exemplified by IBM's PERSONAL SYSTEM/2 Models 50 through 95. The Family I models typically have used the popular INTEL 8088 or 8086 microprocessor as the system processor. These processors have the ability to address one megabyte of memory. The Family II models typically use the high speed INTEL 80286, 80386, and 80486 microprocessors which can operate in a real mode to emulate the slower speed INTEL 8086 microprocessor or a protected mode which extends the addressing range from 1 megabyte to 4 Gigabytes for some models. In essence, the real mode feature of the 80286, 80386, and 80486 processors provide hardware compatibility with software written for the 8086 and 8088 microprocessors.

As the development of personal computers has advanced, there have been proposals for certain standards to be established among makers and users of such apparatus for the purpose of enabling greater exchangability of components and the like. One such standard which has achieved some broad acceptance is the small computer systems interface (SCSI) standard for data communication to and from storage memory devices. For the present purposes, "storage memory devices" is defined broadly to include all devices capable of storing data in digital form, with particular emphasis on such devices as fixed or removable media electromagnetic storage devices (also known as hard and floppy disk drives), electro-optical, tape and other storage devices. SCSI controllers have been known and used prior to this invention, and will be familiar to the knowledgeable reader.

In prior personal computer systems, SCSI controllers have typically been arranged as option or accessory devices, accessed by the system through the accessory or input/output or I/O bus. It is now contemplated to provide a SCSI controller as a single very large scale integrated (VLSI) device or application specific integrated circuit (ASIC) chip, and to provide for connection of that controller directly with the local processor bus. The purpose of so providing such a controller is to achieve enhanced performance in terms of expedited data transfers.

In prior systems having storage controllers, counters are incremented or decremented to track addresses and counts of data transfers. As transfers proceed, addresses are incremented and count is decremented. When a count reaches zero, the transfer is complete. Address and count are either allowed to change by one a multiple of times for each transfer or to increment or decrement by more than one. If changes by more than one are to be permitted, then the logic required becomes extensive.

BRIEF DESCRIPTION OF THE INVENTION

In view of the preceding discussion, it is an object of this invention to provide a storage controller in which address and count functions are accommodated to high performance operations achieved by coupling a storage controller directly to a local processor bus. In realizing this object of the present invention, the logic used is simplified as compared with prior solutions for similar problems, in that incrementing and decrementing of counters proceeds during a transfer while release of the incremented and decremented counts is permitted only after the transfer in progress is completed.

A further object of this invention is to enable testing examination of changing count and address data. In realizing this object of the present invention, evaluation of a personal computer system embodying the present invention is facilitated both in manufacture and in use.

BRIEF DESCRIPTION OF THE DRAWINGS

Some of the objects of the invention having been stated, other objects will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
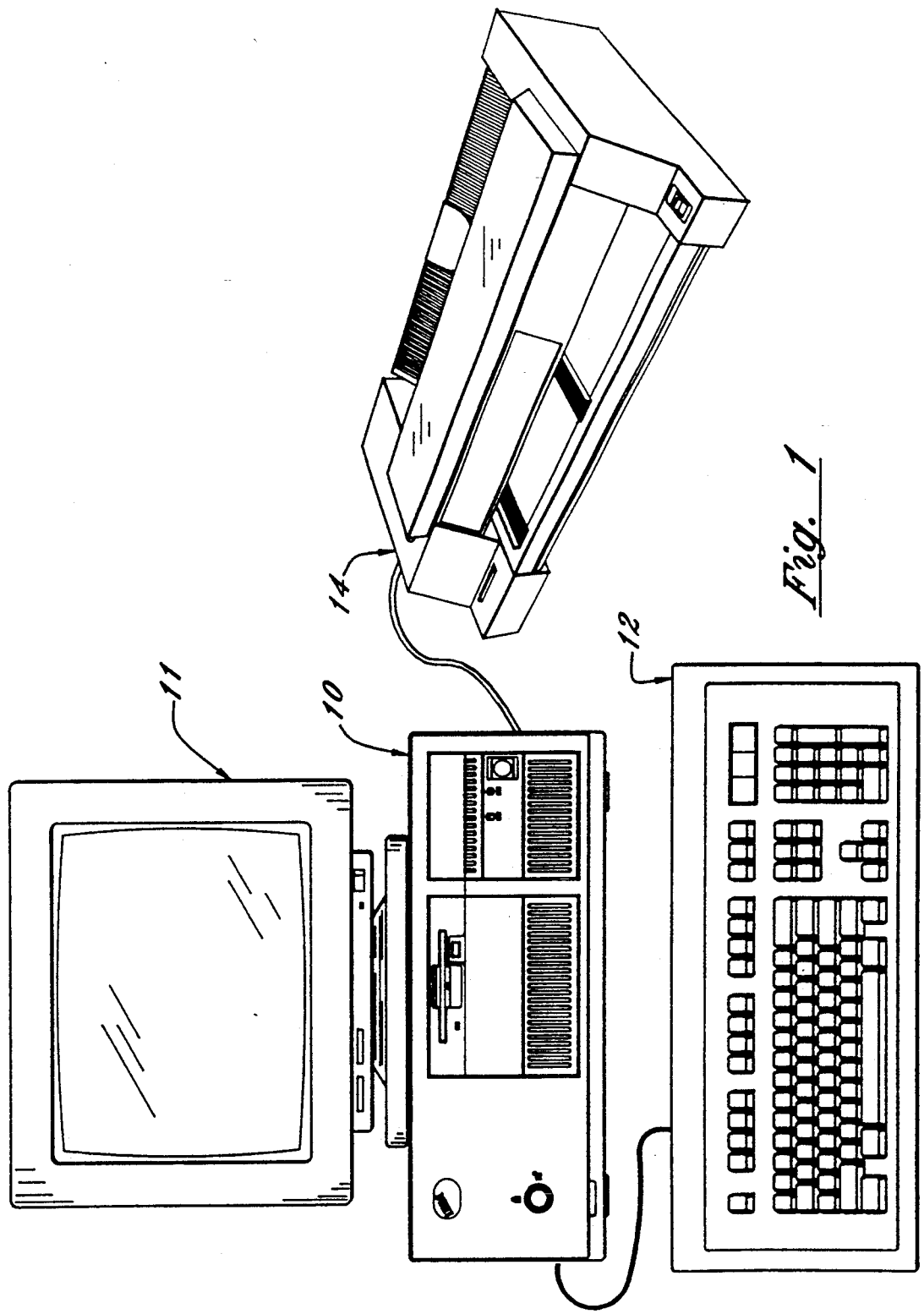
FIG. 1 is a perspective view of a personal computer embodying this invention.
Figure 2:
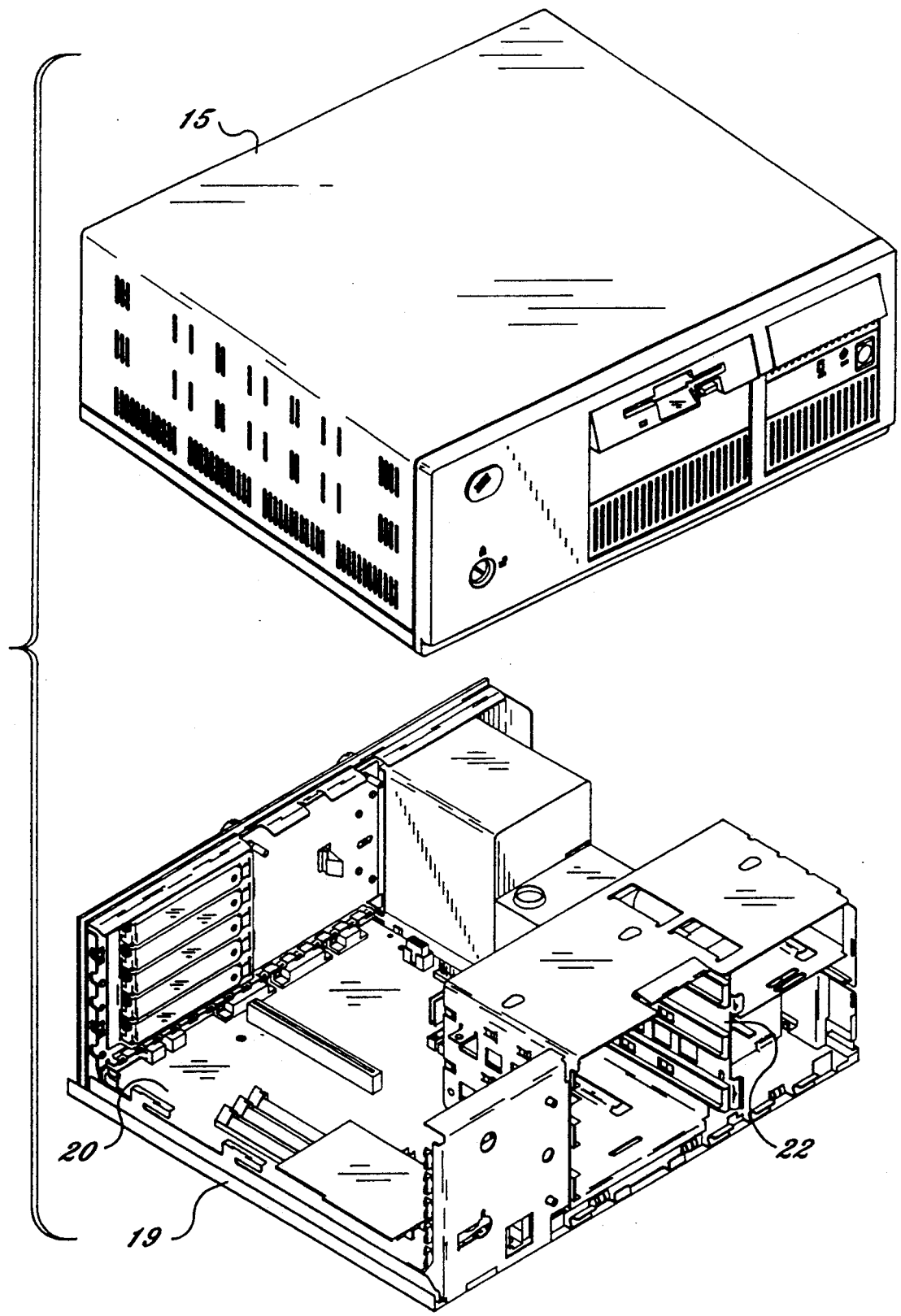
FIG. 2 is an exploded perspective view of certain elements of the personal computer of FIG. 1 including a chassis, a cover, and a planar board and illustrating certain relationships among those elements.

Referring now more particularly to the accompanying drawings, a microcomputer embodying the present invention is there shown and generally indicated at 10 (FIG. 1). As mentioned hereinabove, the computer 10 may have an associated monitor 11, keyboard 12 and printer or plotter 14. The computer 10 has a cover 15 which cooperates with a chassis 19 in defining an enclosed, shielded volume for receiving electrically powered data processing and storage components for processing and storing digital data, as shown in FIG. 2. At least certain of these components are mounted on a multilayer planar 20 or motherboard which is mounted on the chassis 19 and provides a means for electrically interconnecting the components of the computer 10 including those identified above and such other associated elements as floppy disk drives, various forms of direct access storage devices, accessory cards or boards, and the like.

The chassis 19 has a base and a rear panel (FIG. 2) and defines at least one open bay for receiving a data storage device such as a disk drive for magnetic or optical disks, a tape backup drive, or the like. In the illustrated form, an upper bay 22 is adapted to receive peripheral drives of a first size (such as those known as 3.5 inch drives). A floppy disk drive, a removable media direct access storage device capable of receiving a diskette inserted thereinto and using the diskette to receive, store and deliver data as is generally known, may be provided in the upper bay 22.

Figure 3:
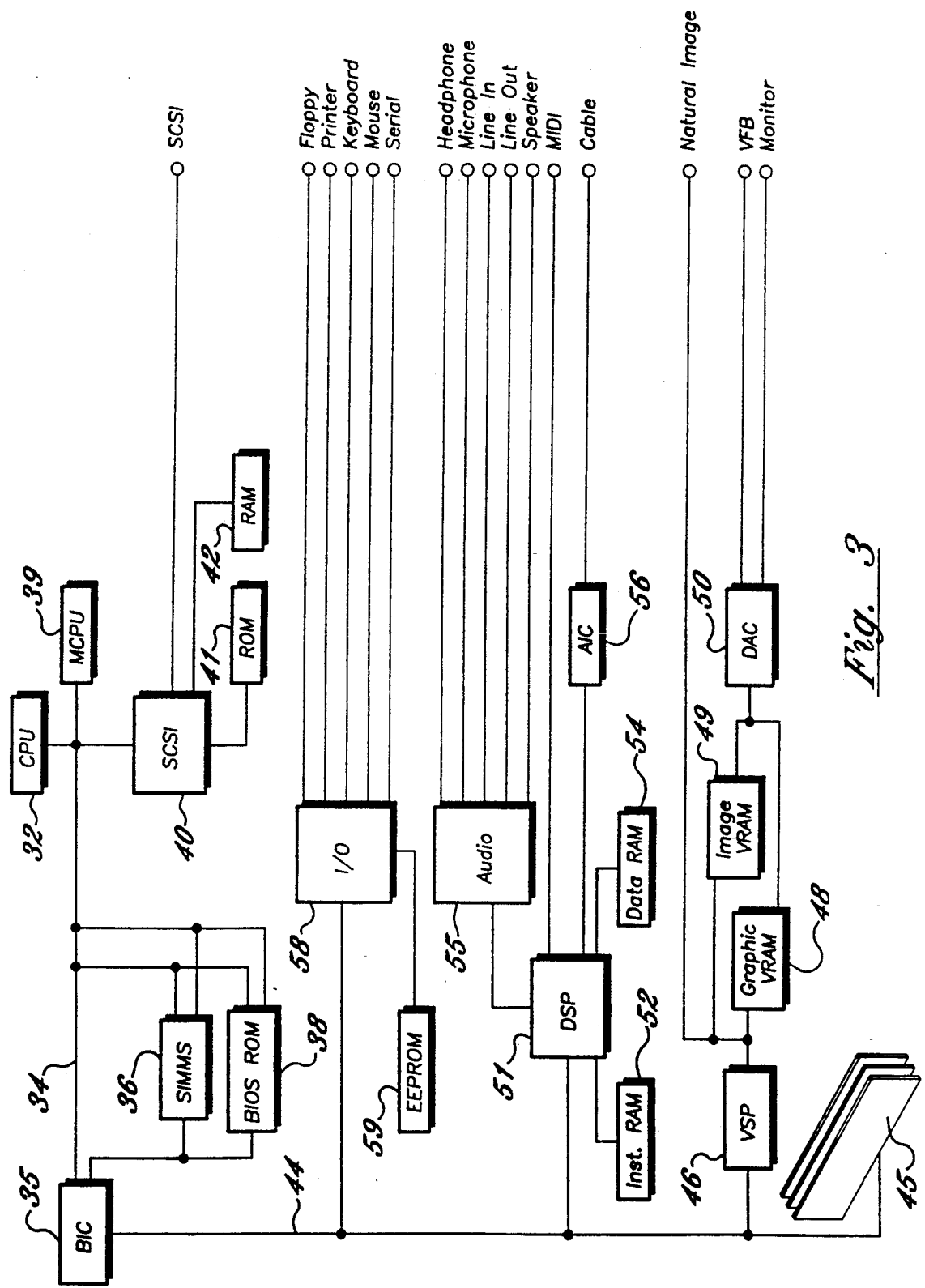
FIG. 3 is a schematic view of certain components of the personal computer of FIGS. 1 and 2.

Prior to relating the above structure to the present invention, a summary of the operation in general of the personal computer system 10 may merit review. Referring to FIG. 3, there is shown a block diagram of a personal computer system illustrating the various components of the computer system such as the system 10 in accordance with the present invention, including components mounted on the planar 20 and the connection of the planar to the I/O slots and other hardware of the personal computer system. Connected to the planar is the system processor 32. While any appropriate microprocessor can be used as the CPU 32, one suitable microprocessor is the 80386 which is sold by INTEL. The CPU 32 is connected by a high speed CPU local bus 34 to a bus interface control unit 35, to volatile random access memory (RAM) 36 here shown as Single Inline Memory Modules (SIMMs) and to BIOS ROM 38 in which is stored instructions for basic input/output operations to the CPU 32. The BIOS ROM 38 includes the BIOS that is used to interface between the I/O devices and the operating system of the microprocessor 32. Instructions stored in ROM 38 can be copied into RAM 36 to decrease the execution time of BIOS.

While the present invention is described hereinafter with particular reference to the system block diagram of FIG. 3, it is to be understood at the outset of the description which follows that it is contemplated that the apparatus and methods in accordance with the present invention may be used with other hardware configurations of the planar board. For example, the system processor could be an Intel 80286 or 80486 microprocessor.

Returning now to FIG. 3, the CPU local bus 34 (comprising data, address and control components) also provides for the connection of the microprocessor 32 with a math coprocessor 39 and a Small Computer Systems Interface (SCSI) controller 40. The SCSI controller 40 may, as is known to persons skilled in the arts of computer design and operation, be connected or connectable with Read Only Memory (ROM) 41, RAM 42, and suitable external devices of a variety of types as facilitated by the I/O connection indicated to the right in the Figure. The SCSI controller 40 functions as a storage controller in controlling storage memory devices such as fixed or removable media electromagnetic storage devices (also known as hard and floppy disk drives), electro-optical, tape and other storage devices.

The bus interface controller (BIC) 35 couples the CPU local bus 34 with an I/O bus 44. By means of the bus 44, the BIC 35 is coupled with an optional feature bus such as a MICRO CHANNEL bus having a plurality of I/O slots for receiving MICRO CHANNEL adapter cards 45 which may be further connected to an I/O device or memory (not shown). The I/O bus 44 includes address, data, and control components.

Coupled along the I/O bus 44 are a variety of I/O components such as a video signal processor 46 which is associated with video RAM (VRAM) for storing graphic information (indicated at 48) and for storing image information (indicated at 49). Video signals exchanged with the processor 46 may be passed through a Digital to Analog Converter (DAC) 50 to a monitor or other display device. Provision is also made for connecting the VSP 46 directly with what is here referred to as a natural image input/output, which may take the form of a video recorder/player, camera, etc. The I/O bus 44 is also coupled with a Digital Signal Processor (DSP) 51 which has associated instruction RAM 52 and data RAM 54 available to store software instructions for the processing of signals by the DSP 51 and data involved in such processing. The DSP 51 provides for processing of audio inputs and outputs by the provision of an audio controller 55, and for handling of other signals by provision of an analog interface controller 56. Lastly, the I/O bus 44 is coupled with a input/output controller 58 with associated Electrical Erasable Programmable Read Only Memory (EEPROM) 59 by which inputs and outputs are exchanged with conventional peripherals including floppy disk drives, a printer or plotter 14, keyboard 12, a mouse or pointing device (not shown), and by means of a serial port.

Turning now to the specific functions served by the SCSI storage controller 40, in order to allow the address and count data for the local processor bus 34 to be generated at a proper time and to be testable in transition states, there is a need for logic which will implement such functions. Further, with a high performance microprocessor such as has been described and with a personal computer system designed for performance at relatively high clock rates, there is a need to assure that address and count data be changed appropriately between the end of one transfer and the beginning of the next. Conventional counters have limitations which impair or prohibit such operation. The present invention contemplates implementing the desired functions while overcoming any difficulties otherwise presented by slower operating counters. In particular, the present invention provides, in the SCSI storage controller 40, at least one counter 60 (FIG. 4) for tracking at least one of address and count data for blocks of data being transferred and capable of signalling through the local processor bus 34 the state of the counter. The storage controller 40 further has a bi-stable device 61 (illustrated as a flip-flop circuit) interposed between the counter 61 and the local processor bus 34 for enabling delivery to the local processor bus of data representing an initial state of the counter 60 at the beginning of a transfer of blocks of data and for continuing delivery of that initial state data throughout a transfer of blocks of data. The counter 60 and bi-stable device 61 cooperate for permitting one of incrementing and decrementing of the counter during transfer of blocks of data while avoiding changes in counter state data delivered to the local processor bus during transfer of blocks of data. Preferably, separate counters are provided for each of address incrementing and data block decrementing, and each has an associated bi-stable device or flip-flop.

Figure 4:
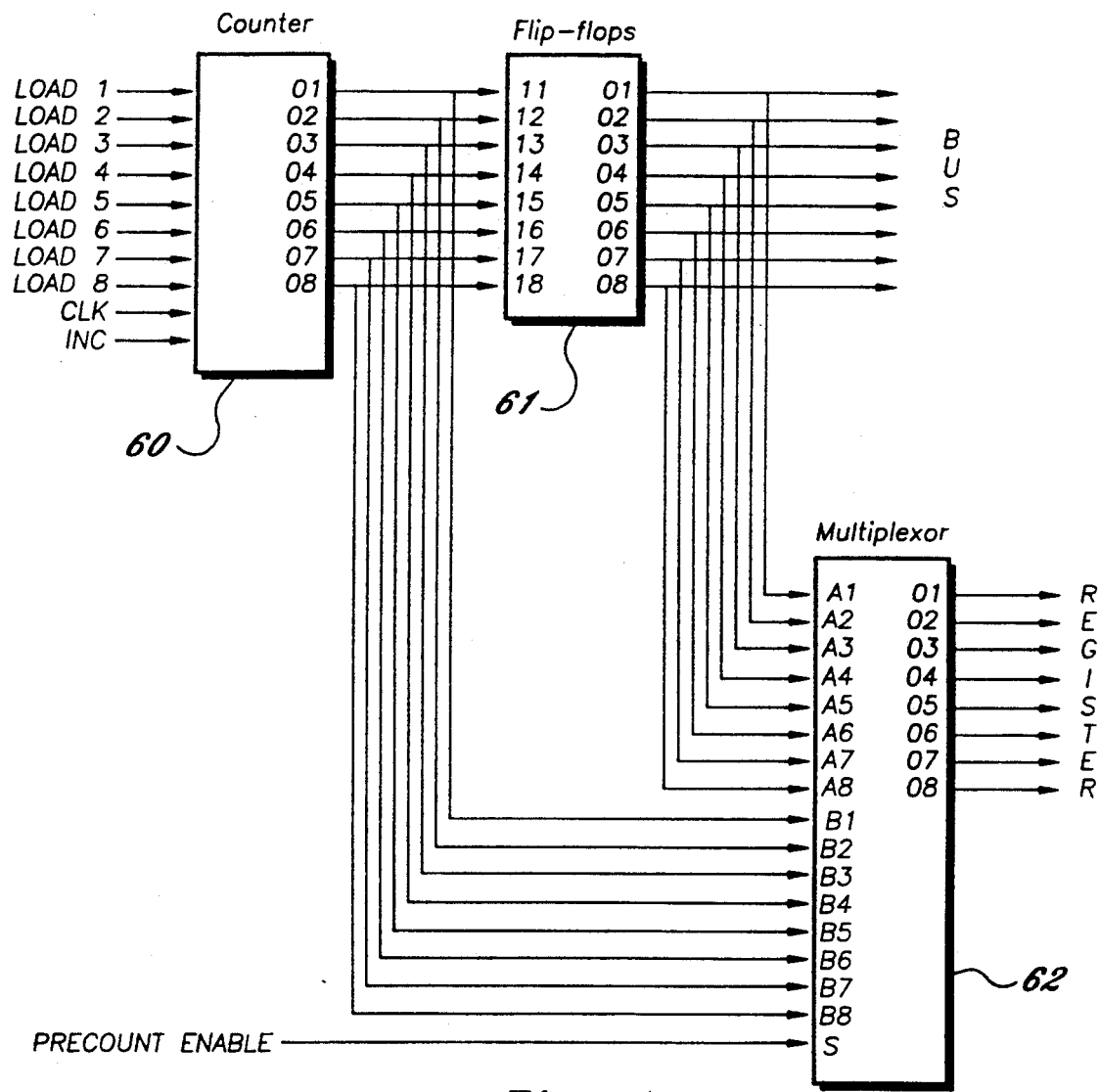
FIG. 4 is a schematic representation of certain functional components incorporated in the storage controller of the personal computer of FIGS. 1 through 3.

With the arrangement described and illustrated in FIG. 4, the counters are allowed to change as the process of transferring blocks of data goes forward. However, the data delivered to the local processor bus for use by other bus logic continues to represent the initial starting information as required for the bus logic to perform its intended functions. The bi-stable devices are changed at the end of a cycle to permit new information to be delivered to the bus. This permits using counters with lesser logic while still meeting bus timing requirements.

With the bi-stable devices in place, there is still a need to be able to confirm the changing states of the counters. In order to selectively tap the data held in the counter 60 and the bi-stable device 61, the outputs of those devices are multiplexed through a multiplexor 62 to a set of registers which can be read by the storage controller processor or otherwise. The multiplexor may be instructed as to which set of data values to bring to the registers, and thus enable selectively reading of either side of the bi-stable device 61.

In the drawings and specifications there has been set forth a preferred embodiment of the invention and, although specific terms are used, the description thus given uses terminology in a generic and descriptive sense only and not for purposes of limitation.

What is claimed is:

1. A personal computer system comprising:
a high speed local processor data bus;
at least one logical processor device coupled directly to said high speed local processor data bus, said processor device being capable of signalling through said high speed local processor data bus an occurrence of the transfer of blocks of data; and
a storage controller coupled directly to said high speed local processor data bus for regulating communications between said processor device and storage memory devices, said storage controller having a counter for tracking at least one of address and count data for blocks of data being transferred and being capable of signalling through said high speed local processor data bus the state of the counter, said storage controller further having a bi-stable device interposed between said counter and said high speed local processor data bus for enabling delivery to said high speed local processor data bus of data representing an initial state of said counter at the beginning of a transfer to blocks of data and for continuing delivery of initial state data throughout a transfer of blocks of data, said counter and said bi-stable device cooperating for permitting a change in the state of said counter during transfer of blocks of data while avoiding changes in counter state data delivered to said high speed local processor data bus during transfer of blocks of data.

2. A personal computer system according to claim 1 wherein said storage controller has a pair of counters, one of said pair tracking address data and being incremented during transfer of blocks of data and the other of said pair tracking count data and being decremented during transfer of blocks of data.

3. A personal computer system according to claim 1 wherein said storage controller has a bi-stable device interposed between said counter and said high speed local processor data bus and further has a multiplexor connected to the output of said counter and to the output of said bi-stable device, said multiplexor for receiving as inputs (a) the changing state of said counter during transfer of blocks of data and (b) the initial state data as delivered by said bi-stable device, and said multiplexor being controllable for delivering as an output a selected one of the state indications received as inputs.

4. A personal computer system according to claim 2 wherein said storage controller has a pair of bi-stable devices, each of said bi-stable devices being interposed between a corresponding one of said counters and said high speed local processor data bus and cooperating with said corresponding one of said pair of counters.

5. A personal computer system comprising:
a high speed local processor data bus;
at least one logical processor device coupled directly to said high speed local processor data bus, said processor device being capable of signalling through said high speed local processor data bus an occurrence of the transfer of blocks of data; and
a storage controller coupled directly to said high speed local processor data bus for regulating communications between said processor device and storage memory devices;
said storage controller having a pair of counters, one of said pair for tracking address data and being incremented during transfer of blocks of data and the other of said pair for tracking count data and being decremented during transfer of blocks of data, said counters for tracking corresponding data for blocks of data being transferred and each being capable of signalling through said high speed local processor data bus the state of the counter;
said storage controller further having a pair of bi-stable devices, each interposed between a corresponding one of said counters and said high speed local processor data bus for enabling delivery to said high speed local processor data bus of data representing an initial state of said corresponding counter at the beginning of a transfer of blocks of data and for continuing delivery of initial state data throughout a transfer of blocks of data, said counters and said bi-stable devices being arranged in cooperating pairs of a counter and a bi-stable device for permitting a change in the state of said counters during transfer of blocks of data while avoiding changes in counter state data delivered to said high speed local processor data bus during transfer of blocks of data; and
said storage controller having a multiplexor connected to the output of at least one of said counters and to the output of a corresponding bi-stable device connected to the same one of said counters, said multiplexor for receiving as inputs (a) the changing state of same one of said counters during transfer of blocks of data and (b) the initial state data as delivered by said corresponding bi-stable device, and said multiplexor being controllable for delivering as an output a selected one of the state indications received as inputs.

* * * * *